Figure 2:

C. E. BONINE.
APPARATUS FOR REGULATING DYNAMO ELECTRIC MACHINES.
APPLICATION FILED FEB. 17, 1906. RENEWED OCT. 11, 1910.
1,026,900.
Patented May 21, 1912.
7 SHEETS—SHEET 1.
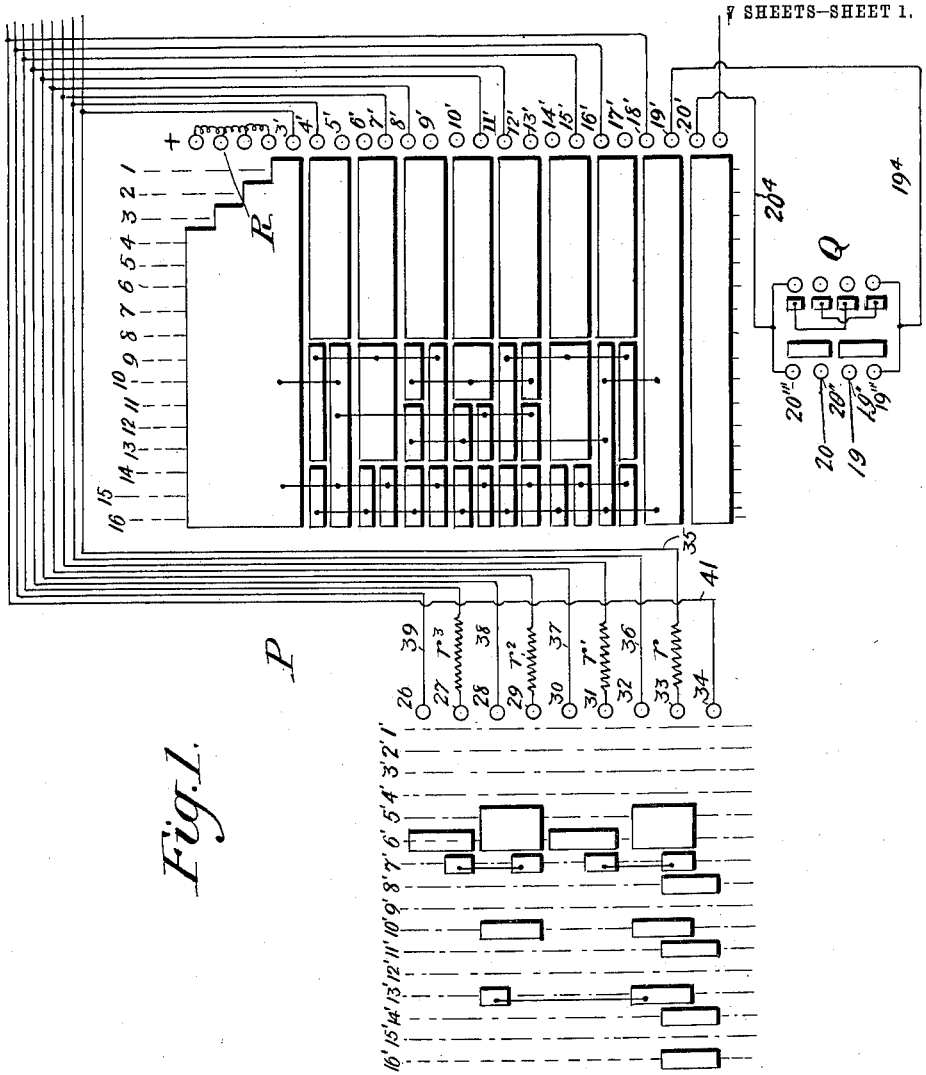
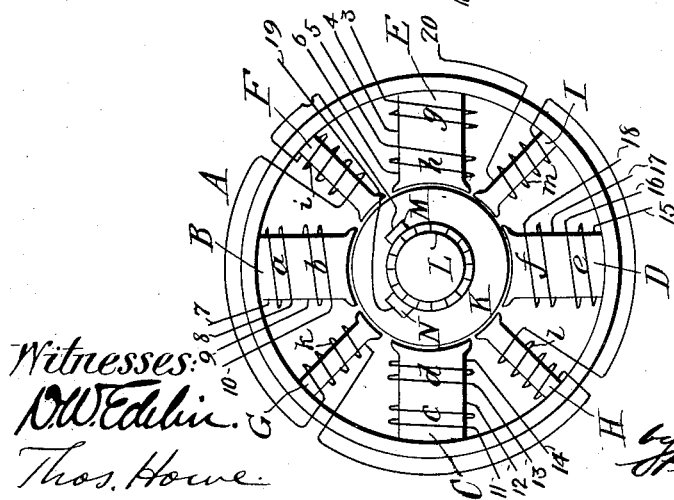
Witnesses:
D. W. Edlin
Thos. Howe
Inventor:
Charles E. Bonine C. E. BONINE.
APPARATUS FOR REGULATING DYNAMO ELECTRIC MACHINES.
APPLICATION FILED FEB. 17, 1906. RENEWED OCT. 11, 1910.

1,026,900.

Patented May 21, 1912.

7 SHEETS—SHEET 2.

Witnesses:
D. W. Edelin
Thos. Howe

Inventor:
Charles E. Bonine
by Hennie Goldsborough
Atty

C. E. BONINE.
APPARATUS FOR REGULATING DYNAMO ELECTRIC MACHINES.
APPLICATION FILED FEB. 17, 1906. RENEWED OCT. 11, 1910.

1,026,900.

Patented May 21, 1912.

7 SHEETS—SHEET 3.

Witnesses:
D.W. Edelin.
Thos. Howe.

Inventor:
Charles E. Bonine
Bonine & Goldsborough
attys.

C. E. BONINE.
APPARATUS FOR REGULATING DYNAMO ELECTRIC MACHINES.
APPLICATION FILED FEB. 17, 1906. RENEWED OCT. 11, 1910.

1,026,900.

Patented May 21, 1912.

7 SHEETS—SHEET 6.

Witnesses:
O. W. Edelin.
Thos. Howe.

Inventor:
Charles E. Bonine,
by Emme Goldsbrough
Atty.

UNITED STATES PATENT OFFICE.

CHARLES E. BONINE, OF ELIZABETH, NEW JERSEY, ASSIGNOR TO ELECTRO-DYNAMIC COMPANY, OF BAYONNE, NEW JERSEY, A CORPORATION OF NEW JERSEY.

APPARATUS FOR REGULATING DYNAMO-ELECTRIC MACHINES.

1,026,900. Specification of Letters Patent. Patented May 21, 1912.

Application filed February 17, 1906, Serial No. 301,609. Renewed October 11, 1910. Serial No. 586,556.

*To all whom it may concern:*

Be it known that I, CHARLES E. BONINE, a citizen of the United States, residing at Elizabeth, county of Union, and State of New Jersey, have invented certain new and useful Improvements in Apparatus for Regulating Dynamo-Electric Machines; and I do hereby declare the following to be a full, clear, and exact description of the invention, such as will enable others skilled in the art to which it appertains to make and use the same.

This invention relates to the regulation of dynamo-electric machines.

It may be employed to control either generators or motors, but it is contemplated that it will find widest application in connection with speed control of motors, especially railway motors.

It has heretofore been proposed to regulate electric machines having commutating poles, by changing the connections of or breaking the circuit through the main field windings, and thereby altering the main fields without altering the connections of the commutating windings.

The object of the present invention is to provide a method of and apparatus for controlling electrical machines by varying the field strength in similarity with the method heretofore proposed as above outlined, but by which the number of breaks necessary to be made in the motor circuit to afford the desired control is minimized or eliminated. This may be accomplished by diverting greater or less proportions of the field current from the field winding, the field strength of which is to be varied, and the diversion may be effected by connecting a loop of appropriate resistance or, where it is desired to short circuit the winding, of such small resistance as to be negligible, to the terminals of the winding from which current is to be diverted.

It will be obvious that the diversion as proposed can be accomplished without opening the motor circuit and the advantage of this will be appreciated by all electrical engineers to whom the dangers and disadvantages of breaking an inductive circuit, such as a field circuit, owing to the induced voltage and persistence of the arc at the break, are well known.

It is not to be understood from the above that the invention is limited to machines having commutating poles, although it is peculiarly adapted for use in connection therewith, nor is it to be understood that the use of the present invention precludes the use of the prior systems of control before referred to in conjunction therewith. In fact, the present invention and one or more of those systems may be employed as supplementary to each other in the same scheme of control. Where control throughout the entire range is effected by diverting current from the field windings according to the present invention, the breaks in the circuit will be entirely eliminated except that the connections of the source of supply will have to be opened upon the stopping of the motor, and where the diversion or loop control is employed in conjunction with those systems of control which require breaking of the circuit, the number of breaks necessary will be reduced according to the extent to which the loop system enters into the scheme. Thus the control may be divided into different stages, each stage being distinguished by relative connections of the field windings different from those of the other stages and during each stage regulation may be effected by the loop system. As an example of this mixed system of control, one stage may be characterized by having certain of the field windings connected in series, while another stage may be characterized by having those windings connected in parallel and during each stage the regulation may be effected by diverting greater or less proportions of the current from the windings by connecting a loop of appropriate resistance about some or all of them. With this mixed system, it will be obvious that a considerable range of control may be effected during any one stage, and it is only when a large change is desired that a change in the stages is made. It will now be clear that while with this mixed system, the breaks in the motor circuit are not entirely eliminated, they are comparatively infrequent and the attendant disadvantages of these breaks are reduced to a corresponding extent.

Figure 15:
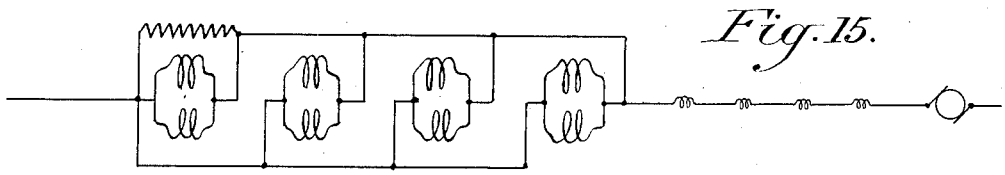
Figure 16:
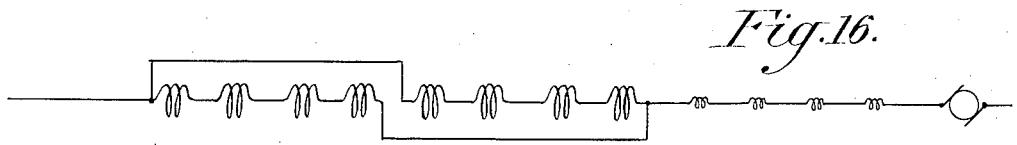
Figure 17:
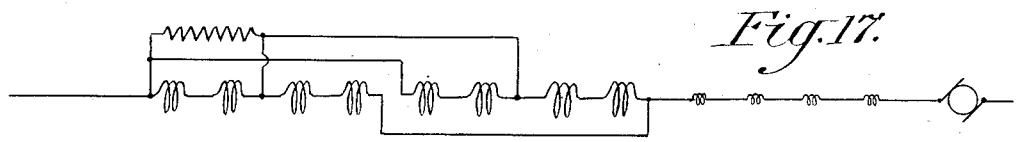
Figure 18:
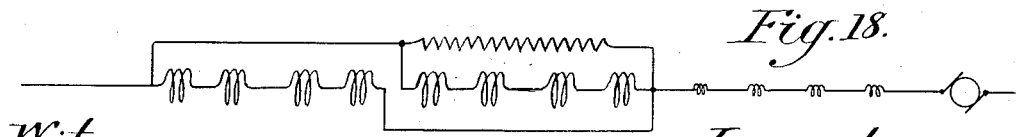
Figure 19:
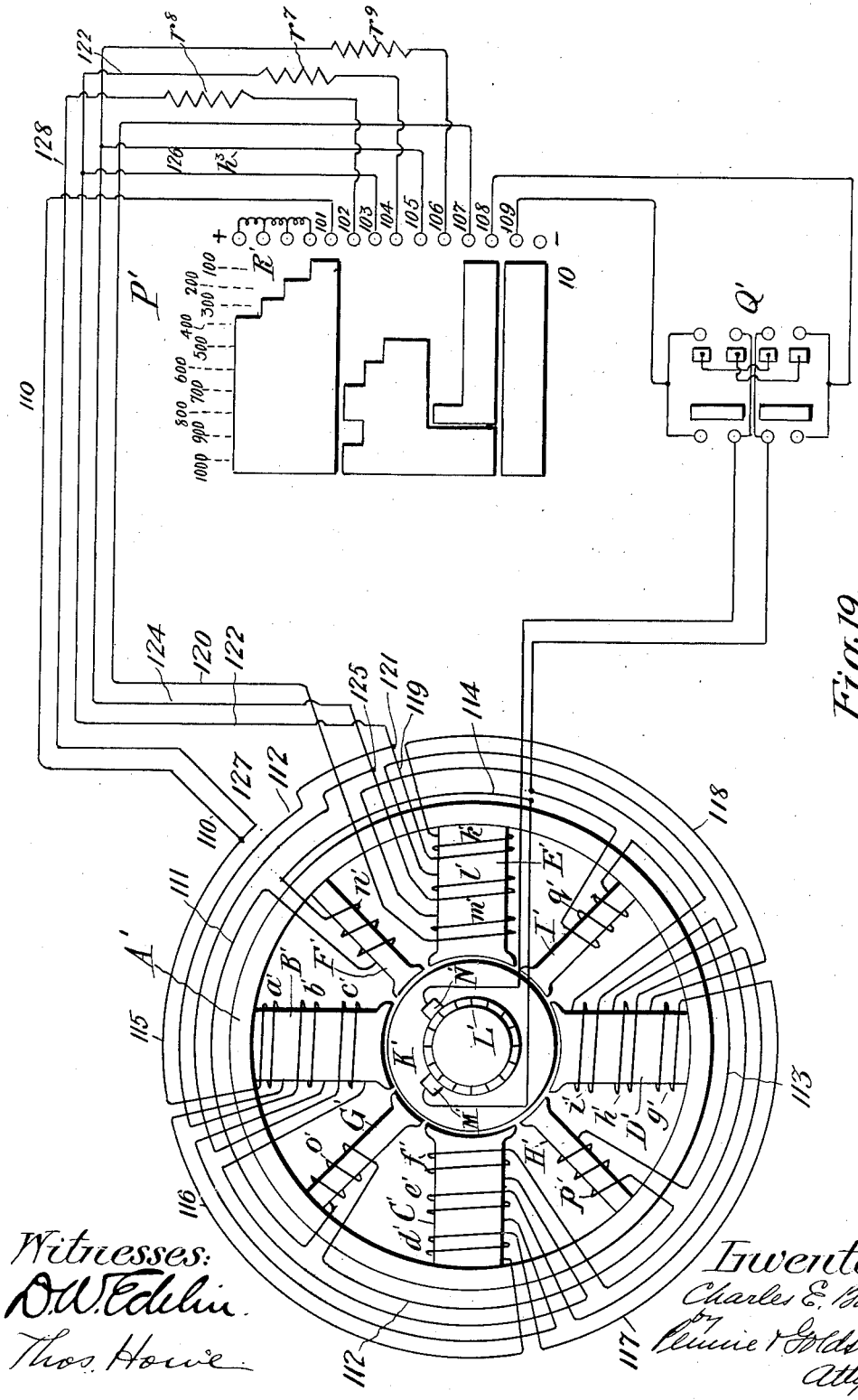

The invention is illustrated in the accompanying drawings, of which,

Figure 1 is a diagram showing the windings of a motor sufficient for an understanding of the present invention, together with a controller for effecting the desired connections. The controller is of the usual cylindrical type, the cylinder contacts being shown as developed upon a plane surface as is customary in illustrating such structures. The stationary contacts are represented as circles, according to the usual mode of representation. Figs. 2 to 15 inclusive are simplified diagrams showing the connections at different steps of the controller. Figs. 16, 17 and 18 are simplified diagrams showing slightly modified connections. Fig. 19 is a diagram similar to Fig. 1 of a modified system of control. Figs. 20 to 27, inclusive, are simplified diagrams showing the connections effected by the apparatus of Fig. 19 at different steps of the controller, and Figs. 28 to 33 inclusive, are simplified diagrams showing the connections of another scheme of control which embodies the invention.

Referring to the drawings and first to Fig. 1, the motor comprises a frame A upon which are mounted the main poles B, C, D and E and the auxiliary or compensating poles F, G, H and I, the last set of poles being designed to furnish the commutating fields for the armature coils and located in the spaces between the main poles. The winding upon each of the main poles is divided into two sections, $a$ and $b$ upon pole B, $c$ and $d$ upon the pole C, $e$ and $f$ upon the pole D, and $g$ and $h$ upon the pole E. Upon the commutating poles are the windings $i$, $k$, $l$ and $m$ respectively, which are connected in series with each other as shown. Within the poles rotates the armature K having the commutator L and a suitable number of brushes M and N, which bear upon the commutator sections connected to coils lying under the commutating poles. The controller P comprises movable and stationary contacts as hereinbefore referred to, and in order to prevent excessive length of the controller, the stationary contacts are divided into two rows instead of being in one row, although the latter construction might be adopted where the length would cause no serious inconvenience. The various contacts will be referred to in connection with the detailed description to follow. A reversing switch Q for interchanging the connections of the armature and commutating pole windings is provided. This switch is of usual construction and requires no special description. It is represented as having its movable contacts in development, as in the case of the controller P and also in correspondence with the illustration of the controller, the stationary contacts are shown as circles. The usual starting resistance and other resistances may be provided as will be hereinafter referred to. Suitable conductors connect the various windings of the motor with the stationary contacts of the controller. In order to avoid confusion, however, the conductors are partly broken away, each of the said conductors being numbered and connected to the fixed controller contact designated by the conductor number primed.

Figure 3:

The apparatus being in the "off" position as shown in Fig. 1, if the movable contacts be turned toward the right until they come into engagement with the stationary contacts and the rows of the latter lie along the lines 1—1 and 1'—1', the circuit may be traced as follows, it being assumed that the movable contacts of the reversing switch Q have been moved into engagement with the left hand row of stationary contacts. From the plus side of the source of supply, the circuit passes through the usual starting resistance R, stationary contact 3', conductor 3, section $g$ of the main field winding, conductor 4, stationary contact 4', stationary contact 5', conductor 5, winding section $h$, conductor 6, stationary contact 6', stationary contact 7', conductor 7, winding section $a$, conductor 8, stationary contacts 8' and 9', conductor 9, winding section $b$, conductor 10, stationary contacts 10' and 11', conductor 11, winding section $c$, conductor 12, stationary contacts 12' and 13', conductor 13, winding section $d$, conductor 14, stationary contacts 14' and 15', conductor 15, winding section $e$, conductor 16, stationary contacts 16' and 17', conductor 17, winding section $f$, conductor 18, stationary contacts 18' and 19', conductor 19$^4$ to the stationary contacts 19''' and 19'', of the reversing switch, conductor 19, brush N, the winding of the armature, brush M, the windings upon the commutating poles, conductor 20, stationary contacts 20'' and 20''' of the reversing switch, conductor 20$^4$, stationary contact 20', to the minus side of the line. The relative connections of the various parts of the motor in this position of the controller are shown in Fig. 2, from which it will be observed that the armature, the sections of the main pole windings, the windings of the commutation poles and the starting resistance R are connected in series between the terminals of the source of supply. It will also be observed that the commutating pole windings are reversed with the armature. The motor will now start up. Further movement of the controller through the second and third positions and into the fourth operates merely to cut out the starting resistance in a well known manner, and in the fourth position, this resistance is entirely cut out, the connections being as shown in Fig. 3, from which it will be observed that the relative connections of the various portions of the motor winding have been unchanged from those which they occupied in the first position.

Figure 4:

In the fifth position of the controller as indicated by the lines 5—5 and 5'—5', the relative connections of the various portions of the motor winding remain unchanged and the circuit is traced through them as in the previous positions. In addition to these circuits, however, circuit may be traced from stationary contact 3', through conductor 35 and resistance $r$ to the stationary contact 33, stationary contact 32 and conductor 36 to stationary contact 4'. Circuit can also be traced from stationary contact 11' through resistance $r^2$ to stationary contact 29 thence through stationary contact 28 and conductor 38 to stationary contact 12'. It will now be observed that the loops comprising respectively the resistances $r$ and $r^2$, which resistances are chosen to effect a diversion of proper proportion of current to effect the desired speed change, are each connected to the terminals of a section of alternate main pole windings, namely $g$ and $c$. The field strength is thus weakened and the balance of the field of the machine remains undisturbed. The connections as a whole are as shown in Fig. 4, from which it will be observed that certain of the sections carry full strength of current, while a certain amount of current being shunted from other of the sections, the field of the motor is weakened and a corresponding increase in speed takes place.

Figure 5:
Figure 6:
Figure 7:
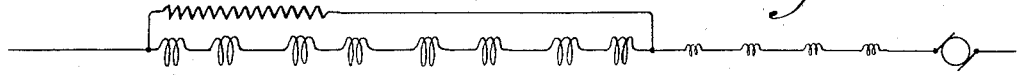

In the next position of the controller as indicated by the dotted lines 6—6 and 6'—6', the relative connections of the various motor windings remain as before, but the loop connections are changed. The resistances $r$ and $r^2$ are looped or shunted across the winding sections $g$ and $c$ as before, but, in addition, circuit may be traced from the stationary contact 7' through resistance $r'$ to stationary contact 31, thence through stationary contact 30 and conductor 37 to stationary contact 8'. Circuit may also be traced from the stationary contact 15' through resistance $r^3$, stationary contacts 27 and 26 and conductor 39 to stationary contact 16'. The connections are now as shown in Fig. 5, from which it will be observed that a section of each of the main pole windings is shunted causing a further weakening of the field and an increase in speed. In the next position of the controller as indicated by the dotted lines 7—7 and 7'—7', the relative connections of the motor windings remain as before but the loop connections are changed. The stationary contacts 27 and 29 are connected together as are the contacts 31 and 33. This results in connecting the resistances $r^2$ and $r^3$ in series across the stationary contacts 12' and 14', and therefore across the winding upon the main pole C, and also in connecting the resistances $r$ and $r'$ in series across the stationary contacts 3' and 6', and therefore across the winding upon the main pole E. The connections as a whole are as shown in Fig. 6 from which it will be seen that the entire windings upon alternate main poles as C and E are shunted. The motor field is therefore weakened and the speed increased. In the next position of the controller as indicated by the dotted lines 8—8 and 8'—8', the looping connections only are changed. The stationary contacts 33 and 34 are connected together, thereby connecting the resistance $r$ between the stationary contacts 3' and 18' and across all the main field windings of the motor as shown in Fig. 7, with the result that current is diverted from all the sections instead of part, as before, which causes a further weakening of the motor field and increase in speed.

Figure 8:
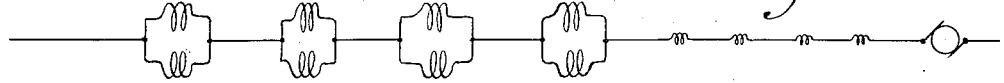

In the next position of the controller as indicated by dotted lines 9—9 and 9'—9', the sections of each of the main poles are connected in parallel and the windings of the poles as wholes are connected in series with the armature and with the windings of the commutating poles, the connection of the windings of the latter poles remaining unchanged. In fact, the windings of the commutating poles in the apparatus shown in Fig. 1 are permanently connected in series so that their relative connection is not changed throughout the range of control. In this ninth position of the controller, circuits may be traced as follows. From the plus side of the line, the circuit passes through the stationary contacts 3' and 5', whence it passes through conductors 3 and 5, the main pole windings $g$ and $h$ and conductors 4 and 6 to stationary contacts 4' and 6', which are connected together and to stationary contacts 7' and 9'. From the stationary contacts 7' and 9', circuit passes through conductors 7 and 9 and main pole windings $a$ and $b$ to conductors 8 and 10 respectively, whence the circuit passes to main contacts 8' and 10', which are connected together and to stationary contacts 11' and 13'. From the contacts 11' and 13', circuit may be traced through conductors 11 and 13 and the main winding sections $c$ and $d$ and conductors 12 and 14 to the stationary contacts 12' and 14' which are connected together and to the stationary contacts 15' and 17'. From the contacts 15' and 17', circuit may be traced through the conductors 15 and 17, the main winding sections $e$ and $f$ and conductors 16 and 18 to the stationary contacts 16' and 18' which are connected together and to the stationary contact 19'. Thence the circuit passes through conductor 19⁴ through the reversing switch armature windings and commutating pole windings as before traced to the stationary contact 20', which is connected to the minus side of the line. Fig. 8 shows this relative connection of the field windings, which results in a still further diminution of the current in them and a corresponding decrease in the field and increase in the speed.

Figure 9:
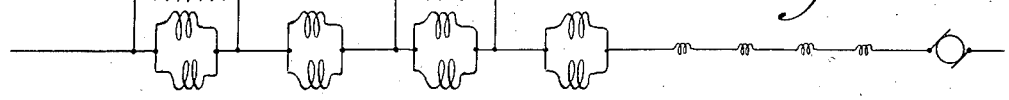
Figure 10:
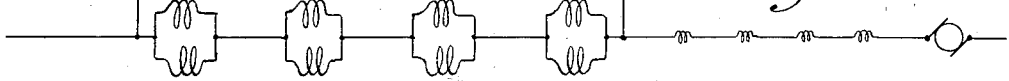
Figure 11:
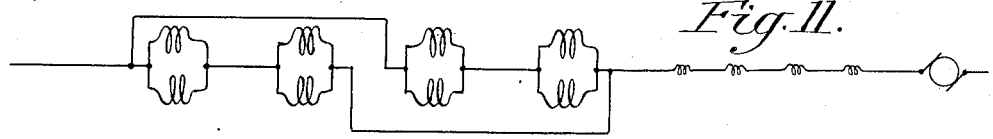

In the 10th position of the controller, the relative connections of the motor windings remain as in the next preceding position. The stationary contacts 28 and 29 are connected together as are also the contacts 32 and 33. The resistance $r^2$ is thus connected between the contacts 11′ and 12′ and the resistance $r$ is connected between the contacts 3′ and 4′. Thus the resistances $r$ and $r^2$ respectively shunt the windings of alternate main poles C and E, the connections being as shown in Fig. 9. The field is weakened and the speed increased. In the next and eleventh position of the controller indicated by the dotted lines 11—11 and 11′—11′, the relative connections of the motor windings remain as in the preceding position. Circuit may however be traced from the stationary contact 5′ through stationary contact 3′ and resistance $r$ to the stationary contact 33, thence through stationary contact 34 and conductor 41 to the stationary contact 18′. The connections are now as shown in Fig. 10, and it will be observed that the main field windings are shunted by a resistance which diverts current from them and causes an increase in speed of the motor. In the next position of the controller as indicated by the dotted lines 12—12 and 12′—12′, the relative connections of the winding sections upon a main pole remain unchanged, but the poles as wholes are divided into pairs, the pairs being connected in parallel, otherwise the relative connections of the motor windings remain as before. The circuit may be traced in Fig. 1, as follows. Starting at the plus side of the line, circuit passes to and through the stationary contacts 3′, 5′, 11′ and 13′. From the contacts 3′ and 5′, parallel circuits may be traced through the conductors 3 and 5, pole winding sections $g$ and $h$ and conductors 4 and 6 to stationary contacts 4′ and 6′, which are connected to the stationary contacts 7′ and 9′, whence parallel circuits may be traced through conductors 7 and 9, pole winding sections $a$ and $b$, and conductors 8 and 10 to stationary contacts 8′ and 10′, which are connected with the stationary contact 19′ from which circuit can be traced through the reversing switch, the armature windings and the commutation windings to the minus side of the source of supply. Parallel circuits may also be traced from the stationary contacts 11′ and 13′ through conductors 11 and 13, main winding sections $c$ and $d$, conductors 12 and 14 to stationary contacts 12′ and 14′ which are connected together and to the stationary contacts 15′ and 17′ whence parallel circuits may be traced through the conductors 15 and 17, main winding sections $e$ and $f$ and conductors 16 and 18 to stationary contacts 16′ and 18′ which are connected to the stationary contact 19′, which is connected to one terminal of the armature as before set forth. The connections now are as shown in Fig. 11, and the current in the windings is reduced over that in the next preceding position so that a corresponding increase in speed takes place.

Figure 12:
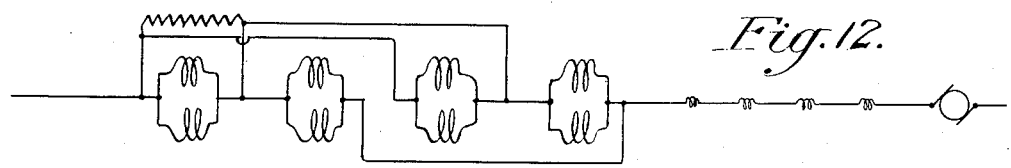
Figure 13:
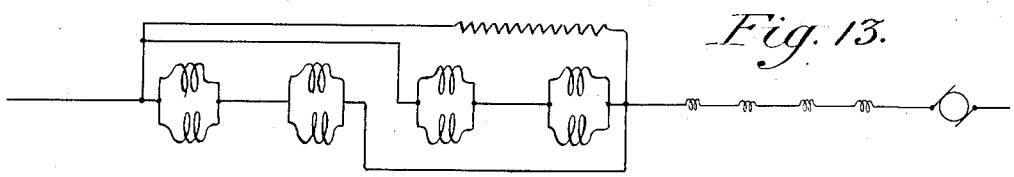
Figure 14:
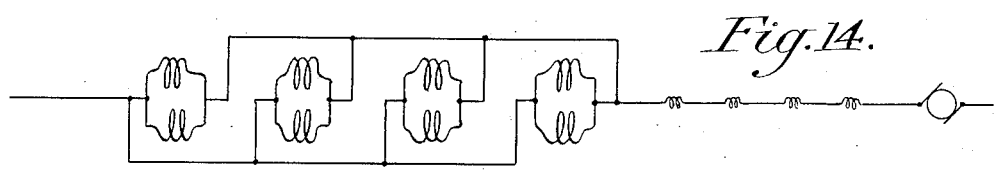

In the next and thirteenth position of the controller, the motor windings are relatively connected as in the next preceding position. The stationary contacts 28, 32 and 33 are, however, connected together and therefore the resistance $r$ is connected in parallel with the windings of the alternate main poles C and E, as shown in Fig. 12. The field of the motor is weakened and the speed increased over the preceding position. In the next position of the controller as indicated by dotted lines 14—14 and 14′—14′, the relative connections of the motor windings remain as before. Circuit may however be traced from the stationary contact 3′ through resistance $r$ to stationary contact 33, thence through stationary contact 34 and conductor 41 to stationary contact 18′. The connections now are as shown in Fig. 13, and it will be observed that a loop containing the resistance $r$ is shunted about the field windings and they are correspondingly weakened with a corresponding increase in speed. In the next position of the controller, as indicated by the dotted lines 15—15 and 15′—15′ of Fig. 1, the relative connections of the windings are still further changed, the various sections of the main windings being connected each in parallel with the remainder, otherwise the connections remain as before. Circuit may be traced as follows: from the plus side of the line to and through the stationary contacts 3′, 5′, 7′, 9′, 11′, 13′, 15′ and 17′, whence parallel circuits can be traced through the main winding sections to the stationary contacts 4′, 6′, 8′, 10′, 12′, 14′, 16′ and 18′ to the stationary contact 19′, which is connected with one terminal of the armature as before described. The connections now are as shown in Fig. 14, and owing to the change in relative connections of the field windings, the field is weakened and an increase in speed takes place. In the next position of the controller as indicated by the dotted lines 16—16 and 16′—16′, the relative connections of the motor windings remain as before, circuit may however be traced from stationary contact 3′ through resistance $r$ to stationary contact 33, thence through stationary contact 34 and conductor 41, to stationary contact 18′. The connections are now as shown in Fig. 15, and it will be seen that the field windings are now shunted by a loop containing the resistance $r$, which results in a decrease of the current through those windings and a corresponding increase in speed.

In Figs. 16, 17 and 18, are shown connections to form which the controller as described would be readily adapted by electrical engineers. The connections of Figs. 16 and 18 are similar to those shown in Figs. 8 and 10 and differ only therefrom in that cross connections at each junction are not shown in Figs. 16, 17 and 18. These cross connections would serve to equalize the current between the windings where they differed in resistance, but ordinarily the same results would be produced, whether the forms shown in Figs. 8 and 10, or those shown in 16, 17 and 18 were employed. Fig. 17 is analogous to Fig. 9, the sections on each main pole being in parallel in the latter and in series in the former.

In Figs. 19 to 27 inclusive, is illustrated the application of the invention to a modified system of control. Referring to the drawings, last mentioned, the motor comprises a main frame A', main poles B', C', D' and E', commutating poles F', G', H' and I', and the armature K' having a commutator L' on which bear the brushes M' and N'. In the structure shown the winding upon each of the main poles is divided into three sections, $a'$, $b'$ and $c'$ upon pole B', $d'$, $e'$ and $f'$ upon pole C', $g'$, $h'$ and $i'$ upon pole D', $k'$, $l'$ and $m'$ upon the pole E'. Upon the commutating poles are the windings $n'$, $o'$, $p'$ and $q'$ respectively. The windings of the motor are suitably connected with stationary contacts 101 to 109 respectively in the controller P' and a reversing switch Q' is provided for interchanging the connections of the armature, and the commutating pole windings in series therewith, to effect reversal of its rotation. Suitable resistances are provided as will be hereinafter set forth. Starting from the conductor 110, circuit may be traced through the main winding section $a'$, conductor 116, main winding section $d'$, conductor 117, main pole winding section $g'$, conductor 118, main pole winding section $k'$, conductor 119 to conductor 112, whence circuit can be traced through the main winding sections $b'$, $e'$, $h'$ and $l'$, in a similar manner to that in which it was traced through the main winding sections $a'$, $d'$, $g'$ and $k'$, and from the last terminal of the section $l'$, circuit may be continued in a similar way through the main winding sections $c'$, $f'$, $i'$ and $m'$. It will now be observed that the windings of the commutation poles are connected in series with each other and with the armature across contacts of the reversing switch, and the sections of the main pole windings are connected in series with each other and across contacts of the controller. It is further to be observed that the sections of the main windings may be regarded as divided into groups, each group comprising a section upon each of the poles, so that upon a change affecting a group, all the poles are equally affected and balanced conditions about the armature are maintained. The relative connections of the field windings as described are undisturbed throughout the range of control, the desired regulation being effected by the loop system. The terminals of the armature and commutating pole windings are connected through the reversing switch to the stationary contacts 108 and 109 and is precisely similar to the armature connections described in connection with Figs. 1 to 18, inclusive.

Figure 20:
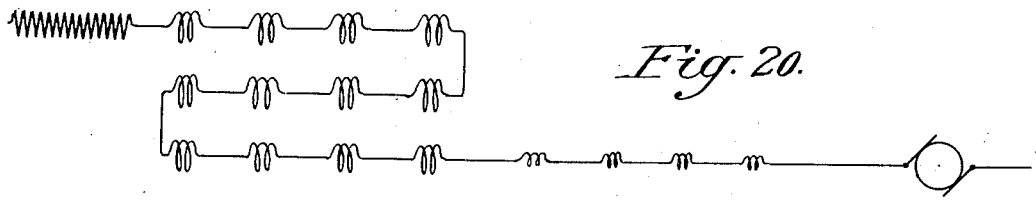
Figure 21:
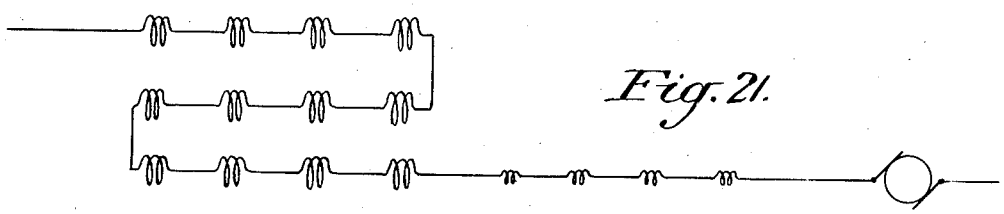

The circuits in the various positions of the controller P' may now be traced as follows. In the first position of the controller as indicated by dotted line 100—100, the circuit passes from the plus side of the line through the starting resistance R', stationary contact 101 and conductor 110 to one terminal of the main winding $a'$, whence the circuit passes through the main pole windings as before described, thence through conductor 120 to the stationary contact 107 to stationary contact 108 and through the reversing switch, armature windings and commutating pole windings to stationary contact 109 and thence to the minus side of the line. The relative connections of the motor windings are then as shown in Fig. 20 and these relative connections remain the same throughout the range of control. Passing through the second and third positions of the controller, the starting resistance is gradually cut out and when the fourth position is reached as indicated by the dotted line 400—400, this resistance is entirely cut out, the connections being as shown in Fig. 21.

Figure 22:
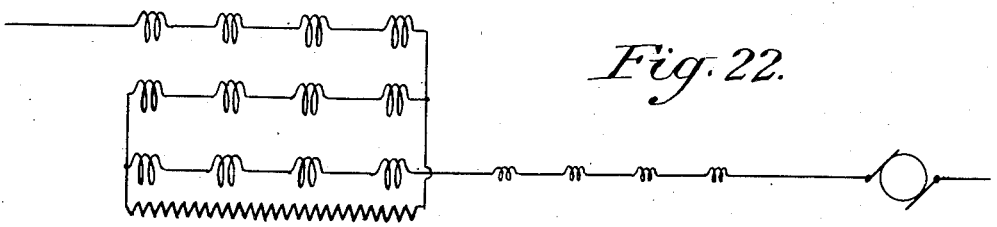
Figure 23:
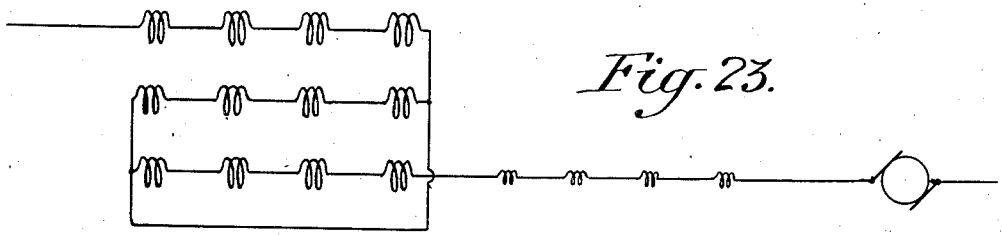
Figure 24:
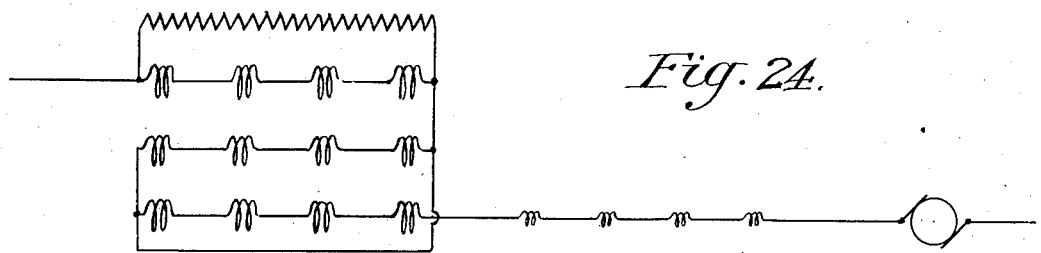
Figure 25:
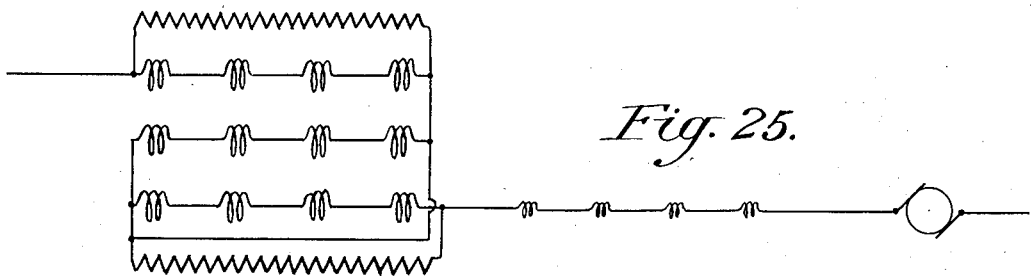
Figure 26:
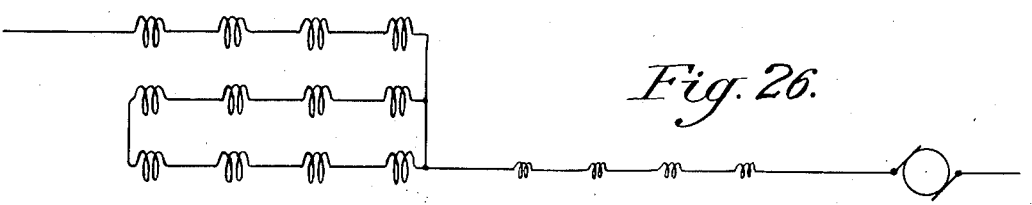
Figure 27:
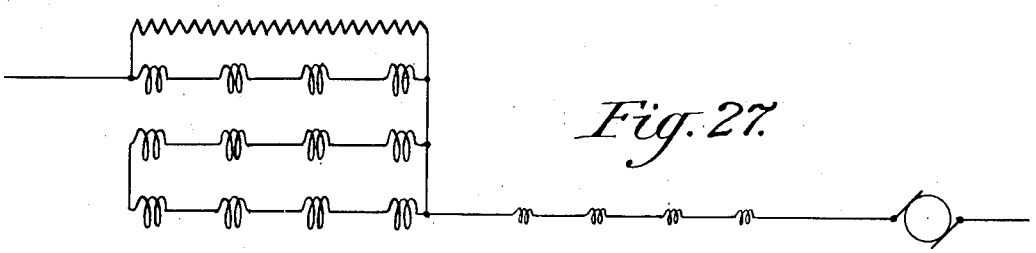

In the fifth position of the controller, the only change effected in the connections of the controller consists in the connecting together of the stationary contacts 104 and 105, whence circuit may then be traced from the junction 121 of the main winding sections $k'$ and $b'$ through conductor 122, resistance $r^7$, stationary contacts 104 and 105, conductor 123, and conductor 124 to the junction 125 of the main winding sections $l'$ and $c'$. It will now be observed that the resistance $r^7$ is looped about the group of main winding sections consisting of the sections $b'$, $e'$, $h'$, and $l'$. Owing to the diversion of the current from these windings, the field will be weakened and a corresponding increase in speed of the motor will take place, the connections in this position being as shown in Fig. 22. In the next position of the controller, as indicated by the dotted lines 600—600, the stationary contact 103 is connected with the stationary contacts 104 and 105. This being the case, it will be seen that the conductor 126, which extends from the conductor 122 to the stationary contact 103 short-circuits the resistance $r^7$ and also the circuit of main winding sections which are shunted thereby. Practically all the current will be diverted from this group of sections, and they will therefore be of practically no effect in producing a field, the speed of the motor will therefore be increased. The connections are then as shown in Fig. 23. In the next position of the controller, as indicated by the dotted lines 700—700, the stationary contact 102 is connected with the stationary contacts 103, 104, and 105, when circuit may be traced from the junction 127 of the main winding section $a'$ through the conductor 128, resistance $r^8$, stationary contact 103, to stationary contacts 104 and 105. It will now be seen that the group of main winding sections consisting of the sections $a'$, $d'$, $g'$ and $k'$ are looped by the resistance $r^8$ and that a corresponding amount of current is diverted from them with a resultant weakening of the field and a corresponding increase of speed, the connections other than the looping by the resistance $r^8$ being maintained. The connections in this position of the controller are as is shown in Fig. 24. In the next position of the controller as indicated by the dotted line 800—800, the connections as described in the preceding position are maintained and the stationary contact 106 is connected with the stationary contacts 107 and 108. Circuit now may be traced from the junction 125 of the main winding section $c'$, through conductor 124 and resistance $r^9$ to the stationary contacts 106, 107 and 108. It will now be seen that the grouping of main winding sections comprising the sections $c'$, $f'$, $i'$ and $m'$ are shunted by the resistance $r^9$ and that otherwise the connections remain the same, the connections as a whole as shown in Fig. 25, and on account of the shunting of additional sections as described, the motor will speed up. In the next position of the controller, the stationary contact 102 passes out of engagement with the movable contacts and the circuit through the loop containing the resistance $r^8$ is broken, while the stationary contacts 103, 104 and 105, which were previously connected together are now also connected with the stationary contacts 106, 107 and 108. Circuit can then be traced directly from the junction 121 of the main winding sections $k'$ and $h'$ through the conductors 122 and 126, and the stationary contact 103 to the stationary contact 108, to which one terminal of the armature is connected. The connections are then as shown in Fig. 26, and it will be observed that the two groups of the main winding sections consisting of the sections $b'$, $e'$, $h'$ and $l'$, $c'$, $f'$, $i'$ and $m'$, are cut out of circuit and that the machine is running under the magnetism produced by the sections $a'$, $d'$, $g'$, and $k'$, which are taking full current. In the next and last position of the controller, the connections remain as before and the stationary contact 103 again passes into engagement with the movable contact. This operates to again establish the circuit through the resistance $r^8$ about the group comprising the main winding sections $a'$, $d'$, $g'$ and $k'$ and current being thus diverted from this group of sections, the field is weakened and the motor speeded up. The connections in this position of the controller are as shown in Fig. 27. It may be noted in connection with the system just described that after the circuit has been once established through the motor windings, this circuit is not broken throughout the range of control, but regulation is accomplished by looping various parts of the windings to produce different running conditions. The breaking of the motor circuit for purposes of regulation is entirely eliminated.

Figure 28:
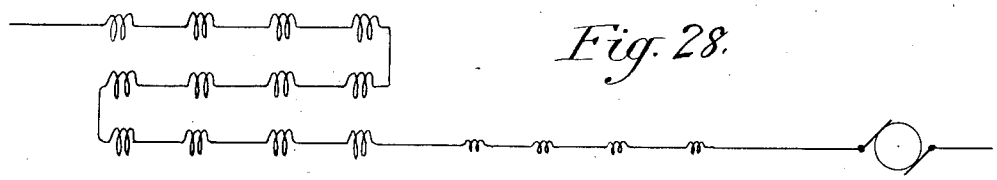
Figure 29:
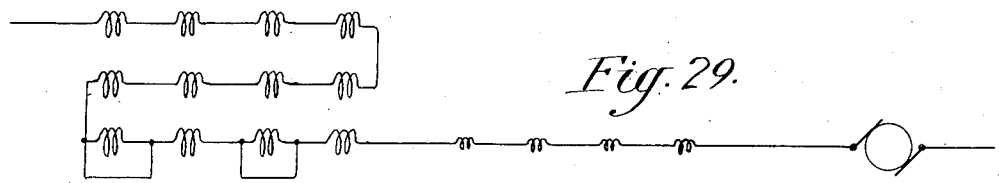
Figure 30:
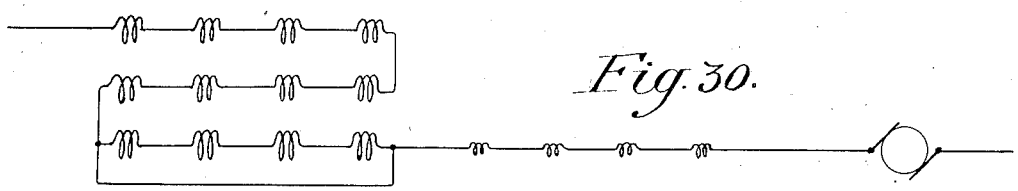
Figure 31:
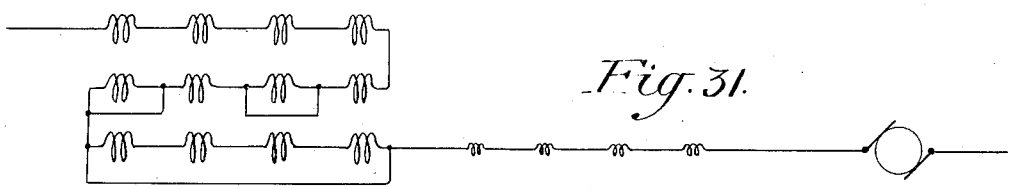

In Figs. 28 to 33 inclusive, are shown the connections of the different steps of a scheme of control in which the relative connections of the motor windings are as in Fig. 19. It will be understood that the motor may be started up by a resistance similar to R' and that after the resistance has been cut out as has been described in connection with the preceding schemes of control, the relative connections of the apparatus will be as shown in Fig. 28. In the next position of the controller, the connections will be as shown in Fig. 29, from which it will be observed that a winding section on each of the alternate poles is shunted by a short circuit and practically deprived of current. The connections in this position are closely analogous to those set forth in Fig. 4. In Fig. 4, the shunts about the sections on alternate poles are of a considerable resistance so that the shunted sections are not wholly deprived of current. According to the connections in Fig. 29, however, the shunts about the sections are of inconsiderable resistance and practically no current flows through the shunted sections of the windings. The shunting of the winding sections by a short-circuiting conductor and by a considerable resistance are connections which differ from each other only in degree and not in principle. This results in weakening the motor field and increasing the speed of the armature. In the next position of the controller, the connections are as indicated in Fig. 30, from which it will be observed that a group of sections including a section upon each of the main poles, is short-circuited. The connections in this figure are analogous to those shown in Figs. 22 and 23. In the next position of the controller, the short-circuit about the group of winding sections as in the preceding figure is maintained and in addition a section upon each of the alternate poles is short-circuited.

Figure 32:
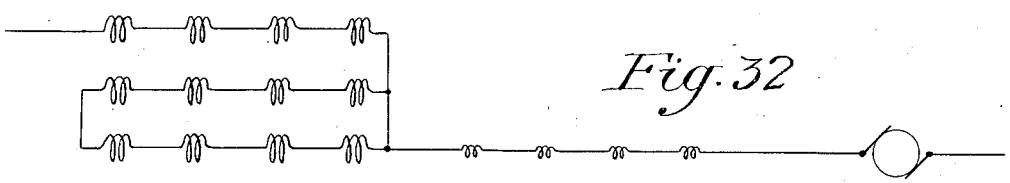
Figure 33:
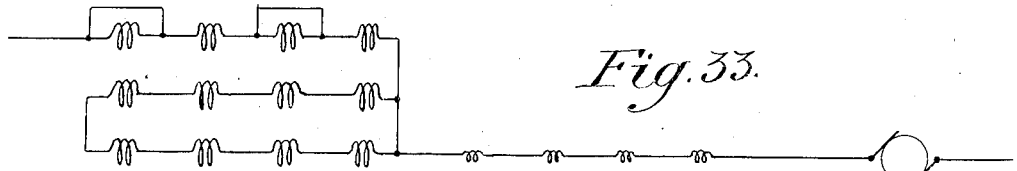

This is a combination of the two methods of variation of the field strength as illustrated in Figs. 29 and 30, and results in the weakening of the field over the connections shown in Fig. 30 and a consequent increase in speed. In the next position of the controller, the connections are as indicated in Fig. 32, from which it will be observed that instead of the current being diverted from one of the groups of winding sections and a portion of the sections to another group, two whole groups of sections are short-circuited, the result is a weakening in field and increase in speed of the motor. The connections as shown in this figure are identical with those shown in Fig. 26. In the next position of the controller, the connections are as indicated in Fig. 33, from which it will be observed that the short-circuit of Fig. 33 is maintained and that sections of the remaining group upon alternate poles are short-circuited. This results in a weakening of the field and an increase in speed of the motor. This last connection is similar to those set forth in Fig. 27, in that two groups of winding sections are short-circuited, but instead of connecting a resistance about all the sections of the unshort-circuited group as in Fig. 27, the sections of this last group which are upon alternate poles are short-circuited in Fig. 33. In many respects, this last scheme of control set forth is superior to those previously described. It will, however, be observed that, like the previous systems, the last depends upon the principle of successively shunting different portions of the field windings in such manner that balanced conditions about the armature are obtained.

It will be observed that at no time during the range of control of any of the systems shown is current diverted from the windings of the commutating poles, nor are the relative connections of those windings changed. This is for the reason that throughout the ordinary range of control, the commutating fields should remain constant except as they change in proportion to the load. The method of and apparatus for meeting special conditions under which it is desirable that the magneto-motive force of the commutating poles should be changed independently of the load form no part of the present invention and since they are immaterial to an understanding of this invention, they have been omitted from the present specification, although the method and apparatus of the present invention may be employed in conjunction therewith.

The invention has been illustrated and described sufficiently to enable anyone skilled in the art to practice it. It will be understood, however, that equivalent apparatus may be employed for carrying out the method and that various constructions and connections may be employed without departing from the spirit of the invention.

It will, of course, be apparent that two, four or more motors regulated and controlled in accordance with the method herein described may be employed on the same car, which motors may themselves have the usual series-multiple control familiar to the art.

Having thus described my invention, what I claim and desire to secure by Letters Patent is:—

1. The combination with a dynamo electric machine, comprising a frame, a plurality of poles supported thereby, windings upon said poles, an armature and conductors communicating therewith, the windings upon alternate poles being in sections, and means for shunting certain of said sections without shunting the remainder thereof.

2. The combination with a dynamo electric machine, comprising a frame, a plurality of poles supported thereby, windings upon said poles, an armature and conductors communicating therewith, the windings upon alternate poles being in sections, and means for shunting equal sections upon each of said alternate poles without shunting the remainder of the sections.

3. The combination with a dynamo electric machine, comprising a frame, main and commutation poles supported thereby, windings upon said poles, an armature and conductors communicating therewith, of means for shunting the windings upon the main poles without shunting the windings upon the commutation poles.

4. The combination with a dynamo electric machine, comprising a frame, main and commutation poles supported thereby, said commutation poles alternating with said main poles, windings upon said poles, an armature and conductors communicating therewith, of means for shunting the main pole windings without shunting the windings upon the commutation poles.

5. The combination with a dynamo electric machine, comprising a frame, main and commutation poles supported thereby, windings upon said poles, an armature and conductors communicating therewith, the windings upon the main poles being in section, of means for shunting equal sections on each of the main poles without shunting the remainder of the field windings.

6. The combination with a dynamo electric machine, comprising a frame, main and commutation poles supported thereby, windings upon said poles, an armature and conductors communicating therewith, of means for shunting equal portions of the windings upon each of the main poles without shunting the remainder of the field windings.

7. The combination with a dynamo electric machine, comprising a frame, a plurality of poles supported thereby, windings upon said poles, an armature and conductors communicating therewith, the windings upon alternate poles being in sections, of means for connecting said windings in series with said armature and for shunting certain of said sections without shunting the remainder thereof.

8. The combination with a dynamo electric machine, comprising a frame, a plurality of poles supported thereby, windings upon said poles, an armature and conductors communicating therewith, the windings upon alternate poles being in sections, of means for shunting equal sections upon each of said alternate poles without shunting the remainder of the sections, and for connecting said pole windings in series with said armature.

9. The combination with a dynamo electric machine, comprising a frame, a plurality of main and commutation poles supported thereby, windings upon said poles, an armature and conductors communicating therewith, of means for connecting said windings in series with said armature and for shunting the windings upon the main poles without shunting the windings upon the commutation poles.

10. The combination with a dynamo electric machine, comprising a frame, main and commutation poles supported thereby, said commutation poles alternating with said main poles, windings upon said poles, an armature and conductors communicating therewith, of means for connecting said windings in series with said armature and for shunting the main pole windings without shunting the windings upon the commutation poles.

11. The combination with a dynamo electric machine, comprising a frame, main and commutation poles supported thereby, said commutation poles alternating with said main poles, windings upon said poles, an armature and conductors communicating therewith, the windings upon the main poles being in sections, of means for connecting all of said pole windings in series with said armature, and for shunting equal sections on each of the main poles without shunting the remainder of the field windings.

12. The combination with a dynamo electric machine, comprising a frame, main and commutation poles supported thereby, said commutation poles alternating with said main poles, windings upon said poles, an armature and conductors communicating therewith, of means for connecting said windings in series with said armature, and for shunting equal portions of the windings upon each of the main poles without shunting the remainder of the field windings.

13. The combination with a dynamo electric machine, comprising a frame, a plurality of poles supported thereby, windings upon said poles, an armature and conductors communicating therewith, of a controller and connections adapted to connect the windings of said machine in operative relation, and to maintain the circuit of said machine throughout the range of control, and to shunt certain of the windings upon said poles without shunting the remainder thereof.

14. The combination with a dynamo electric machine, comprising a frame, a plurality of poles supported thereby, windings upon said poles, an armature and conductors communicating therewith, of a controller and connections adapted to connect the windings of said machine in operative relation, to maintain the circuit of said machine throughout the range of control, and to shunt the windings upon certain of said poles without shunting the windings upon the other poles.

15. The combination with a dynamo electric machine, comprising a frame, a plurality of poles supported thereby, windings upon said poles, an armature and conductors communicating therewith, of a controller and connections adapted to connect the windings of said machine in operative relation, to maintain the circuit of said machine throughout the range of control, and to shunt the windings upon alternate poles without shunting the windings upon the remainder of said poles.

16. The combination with a dynamo electric machine, comprising a frame, a plurality of poles supported thereby, windings upon said poles, an armature and conductors communicating therewith, of a controller and connections adapted to connect the windings of said machine in operative relation, to maintain the circuit of said machine throughout the range of control, and to shunt equal portions of the windings of each of certain of said poles without shunting the remainder of the windings.

17. The combination with a dynamo electric machine, comprising a frame, main and commutation poles supported thereby, windings upon said poles, an armature and conductors communicating therewith, of a controller and connections adapted to connect the windings of said machine in operative relation, to maintain the circuit of said machine throughout the range of control, and to shunt the windings upon the main poles without shunting the windings upon the commutation poles.

18. The combination with a dynamo electric machine, comprising a frame, main and commutation poles supported thereby, windings upon said poles, an armature and conductors communicating therewith, of a controller and connections adapted to connect the windings of said machine in operative relation, to maintain the circuit of said machine throughout the range of control, and to shunt equal portions of the windings upon each of the main poles without shunting the remainder of the field windings.

19. The combination with a dynamo electric machine, comprising a frame, a plurality of poles supported thereby, windings upon said poles, an armature and conductors communicating therewith, the pole windings being permanently connected with relation to each other, of means for connecting the armature and field windings in operative relation, and for shunting certain of said pole windings without shunting the remainder thereof.

20. The combination with a dynamo electric machine, comprising a frame, a plurality of poles supported thereby, windings upon said poles, an armature and conductors communicating therewith, the pole windings being permanently connected with relation to each other, of means for connecting the armature and field windings in operative relation and for shunting the windings upon certain of said poles without shunting the windings upon the other poles.

21. The combination with a dynamo electric machine, comprising a frame, a plurality of poles supported thereby, windings upon said poles, an armature and conductors communicating therewith, the pole windings being permanently connected with relation to each other, of means for connecting the armature and field windings in operative relation, and for shunting windings upon alternate poles without shunting windings upon the remainder of said poles.

22. The combination with a dynamo electric machine, comprising a frame, a plurality of poles supported thereby, windings upon said poles, an armature and conductors communicating therewith, the pole windings being permanently connected with relation to each other, of means for connecting the armature and field windings in operative relation, and for shunting equal portions of the windings of each of certain of said poles without shunting the remainder of the windings.

23. The combination with a dynamo electric machine, comprising a frame, main and commutation poles supported thereby, windings upon said poles, an armature and conductors communicating therewith, the pole windings being permanently connected with relation to each other, of means for connecting the armature and field windings in operative relation, and for shunting windings upon the main poles without shunting windings upon the commutation poles.

24. The combination with a dynamo electric machine, comprising a frame, main and commutation poles supported thereby, windings upon said poles, an armature and conductors communicating therewith, the pole windings being permanently connected with relation to each other, of means for connecting the armature and field windings in operative relation, and for shunting equal portions of the windings upon each of the main poles without shunting windings upon the commutation poles.

25. The combination with a dynamo electric machine, comprising main and commutating poles, of means for successively shunting different portions of the field windings upon the main poles.

26. The combination with a dynamo electric machine, comprising main and communicating poles, of means for shunting windings upon alternate main poles without shunting the remainder of the main pole windings.

27. In a system of motor control, a motor having main poles carrying sectional windings, the said sections being permanently connected in series, means for maintaining a commutating field independent of the main field and substantially proportional to the armature current, and a controller and connections adapted to establish shunt circuits about successive symmetrically placed sections of the main field coils, whereby the main field is progressively weakened without distortion, and sparking is prevented at all speeds and loads, substantially as described.

28. In a system of motor control, a motor having main poles carrying sectional windings, the said sections being permanently connected in series, means for maintaining a commutating field independent of the main field and substantially proportional to the armature current, and a controller and connections adapted to establish shunt circuits of negligible resistance about successive symmetrically placed sections of the main field coils, whereby the main field is progressively weakened without distortion, and sparking is prevented at all speeds and loads, substantially as described.

29. In a system of motor control, a motor having main poles carrying sectional windings, the said sections being permanently connected in series, means for maintaining a commutating field independent of the main field and substantially proportional to the armature current, and a controller and connections adapted to establish shunt circuits at successive steps about corresponding sections of alternate main field coils, whereby the main field is progressively weakened without distortion, and sparking is prevented at all speeds and loads, substantially as described.

30. In a system of motor control, a motor having main field poles, a plurality of groups of magnetizing coils on said poles, each group including a coil on each pole, said coils and groups being permanently connected in series, means for maintaining a commutating field independent of the main field and substantially proportional to the armature current, and a controller and connections adapted to establish cumulatively by successive steps shunt circuits about said coils, the said shunts including all the alternate coils in a group at each step, whereby the main field is progressively weakened without distortion and sparking is eliminated at all speeds and loads, substantially as described.

31. In a system of motor control, a motor having a frame, main and commutating poles supported thereby, magnetizing coils on the commutating poles, a plurality of groups of magnetizing coils on the main poles, each group including a coil on each main pole, said commutating coils and main coils being permanently connected in series with one another and with the armature, and a controller and connections adapted to establish cumulatively by successive steps shunt circuits about the main field coils, the said shunts including all the alternate coils in a group at each step, whereby the main field is progressively weakened without distortion and sparking is eliminated at all speeds and loads, substantially as described.

In testimony whereof I affix my signature, in presence of two witnesses.

CHARLES E. BONINE.

Witnesses:
EDWIN M. SMITH,
JOHN F. TRUDEAU.